(12) United States Patent
Volny et al.

(10) Patent No.: US 10,647,437 B2
(45) Date of Patent: May 12, 2020

(54) CONTINUOUSLY TENSIONED TRUSS STRAP

(71) Applicant: Goodrich Corporation, Charlotte, NC (US)

(72) Inventors: Jaro S. Volny, Scottsdale, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 303 days.

(21) Appl. No.: 15/714,979

(22) Filed: Sep. 25, 2017

(65) Prior Publication Data
US 2019/0092482 A1    Mar. 28, 2019

(51) Int. Cl.
*B64D 25/14* (2006.01)
*A62B 1/20* (2006.01)

(52) U.S. Cl.
CPC ............... *B64D 25/14* (2013.01); *A62B 1/20* (2013.01)

(58) Field of Classification Search
CPC .................................. B64D 25/14; A62B 1/20
USPC ............................................. 244/138 R, 905
See application file for complete search history.

(56) References Cited

U.S. PATENT DOCUMENTS

| | | | |
|---|---|---|---|
| 3,473,641 A | 10/1969 | Fisher | |
| 3,860,984 A * | 1/1975 | Fisher | A62B 1/20 441/41 |
| 4,018,321 A * | 4/1977 | Fisher | A62B 1/20 193/25 B |
| 4,434,870 A * | 3/1984 | Fisher | A62B 1/20 182/48 |
| 4,519,782 A * | 5/1985 | Fisher | A62B 1/20 182/48 |
| 4,723,628 A * | 2/1988 | Fisher | A62B 1/20 182/48 |
| 5,975,467 A * | 11/1999 | O'Donnell | B64D 25/14 182/48 |
| 6,454,220 B1 * | 9/2002 | Oney | B64D 25/14 182/48 |
| 6,536,715 B1 | 3/2003 | Moran et al. | |
| 6,581,334 B2 * | 6/2003 | Oney | A62B 1/20 138/120 |

(Continued)

FOREIGN PATENT DOCUMENTS

| | | | | |
|---|---|---|---|---|
| EP | 1410987 A2 * | 4/2004 | ............. | B64D 25/14 |
| EP | 1431178 A1 * | 6/2004 | ............. | B64D 25/14 |
| EP | 3459854 A2 * | 3/2019 | ............. | B64D 25/14 |

OTHER PUBLICATIONS

European Patent Office, European Partial Search Report dated May 22, 2019 in Application No. 18196248.1.

*Primary Examiner* — Christopher P Ellis
(74) *Attorney, Agent, or Firm* — Snell & Wilmer L.L.P.

(57) ABSTRACT

A support arrangement for an inflatable evacuation system may comprise an inflatable member configured to be elongated and stiffened in a longitudinal direction in response to being in an inflated condition, a protrusion extending orthogonal to a surface of the inflatable member, a tensile member attached at least two locations to the inflatable member on opposing sides of the protrusion and being slidably engagable over the protrusion so as to maintain about equal tension in the tensile member on opposing sides of the protrusion, and a sleeve attached to the protrusion configured to maintain the tensile member laterally relative to the protrusion even as the tensile member is able to slide longitudinally.

8 Claims, 10 Drawing Sheets

(56) References Cited

U.S. PATENT DOCUMENTS

| | | | |
|---|---|---|---|
| 6,966,414 B2* | 11/2005 | Zonneveld | A62B 3/00 |
| | | | 193/25 A |
| 7,090,168 B1* | 8/2006 | Brown | B64D 25/14 |
| | | | 182/48 |
| 10,000,292 B1* | 6/2018 | Haynes | A62B 1/20 |
| 10,246,195 B2* | 4/2019 | Prevost | B64D 25/14 |
| 2006/0201960 A1 | 9/2006 | Frayne | |
| 2017/0015429 A1* | 1/2017 | Evans | B64D 25/14 |
| 2018/0194482 A1* | 7/2018 | Volny | B64D 25/14 |
| 2018/0201379 A1* | 7/2018 | Bahena | B64D 25/14 |
| 2018/0273190 A1* | 9/2018 | Haynes | B64D 25/14 |
| 2018/0327101 A1* | 11/2018 | Haynes | B64D 25/14 |
| 2018/0334257 A1* | 11/2018 | Haynes | B64D 25/14 |

* cited by examiner

CONTINUOUSLY TENSIONED TRUSS STRAP

FIELD

The present disclosure relates to inflatable evacuation slides and, in particular, to inflatable evacuation slides having supplemental structural support arrangements.

BACKGROUND

Emergency evacuation slides may be used to exit an aircraft absent a jet way or other suitable means of egress for passengers. The slides may deploy from a door sill or a side of the aircraft fuselage, for example. Various additional tubes and/or straps may be utilized to increase structural strength of the emergency evacuation slide. Truss straps may be used to provide additional strength and may be bonded at multiple locations to truss pillows or dropdown tubes. Improper truss strap tension between bonding locations tends to decrease the structural strength of the emergency evacuation slide.

SUMMARY

In various embodiments, a support arrangement for an inflatable evacuation system is provided comprising an inflatable member configured to be elongated and stiffened in a longitudinal direction in response to being in an inflated condition, a protrusion extending orthogonal to a surface of the inflatable member, a tensile member attached at at least two locations to the inflatable member on opposing sides of the protrusion and being slidably engagable over the protrusion so as to maintain about equal tension in the tensile member on opposing sides of the protrusion, and a sleeve attached to the protrusion configured to maintain the tensile member laterally relative to the protrusion even as the tensile member is able to slide longitudinally. The support arrangement may further comprise a first strap disposed within a void space In various embodiments, a first strap is configured to slide along a base portion in response to a tension force. In various embodiments, the base portion is coupled to a surface. In various embodiments, the first strap further comprises a first end coupled proximate a head end of an evacuation slide and a second end coupled proximate a toe end of the evacuation slide. In various embodiments, the base portion comprises a same material as a sliding surface of the evacuation slide. In various embodiments, the support arrangement may further comprise a second strap coupled to one of the base portion or a sleeve portion. In various embodiments, the first strap comprises one of a corded or woven material, an elastomer, an aramid, a para-aramid, a nylon, a ballistic nylon, a polypropylene, a polyethylene, an ultra-high-molecular-weight polyethylene, a polyester, or a cotton.

In various embodiments, an evacuation system for an aircraft structure is provided comprising an evacuation slide coupled to the aircraft structure, the evacuation slide comprising a first side tube, a second side tube, the second side tube and the first side tube defining a lane of a sliding surface, a head end, a toe end and a continuous tension coupling comprising a base portion, a sleeve portion coupled across the base portion, wherein the sleeve portion has a first edge and a second edge, and a void space between the base portion and the sleeve portion, wherein the void space is open along the first edge and the second edge.

In various embodiments, a first strap disposed within the void space. In various embodiments, the first strap is configured to slide along the base portion in response to a tension force. In various embodiments, the evacuation system for an aircraft structure further comprises one of a truss pillow or an arched tube coupled to one of the first side tube, the second side tube, or the center tube. In various embodiments, the first strap further comprises a first end coupled proximate the head end of the evacuation slide and a second end coupled proximate the toe end of the evacuation slide. In various embodiments, the continuous tension coupling is coupled to one of the truss pillow or the arched tube. In various embodiments, one of the truss pillow or the arched tube is configured to provide vertical support to the evacuation slide in response to the tension force. In various embodiments, a second strap may be coupled to one of the base portion or the sleeve portion and coupled to the center tube. In various embodiments, the base portion comprises a same material as the sliding surface of the evacuation slide.

In various embodiments, a method for manufacturing a continuously tensioned truss strap is provided. The method may comprise providing a base portion, coupling a sleeve portion having a first edge and a second edge across the base portion, forming a void space therebetween opening along the first edge and the second edge; and disposing a strap within the void space configured to slide along the base portion in response to a tension force. The method may further comprise coupling the base portion to one of a truss pillow or an arched tube. The method may further comprise coupling the strap at a first end proximate a toe end of an evacuation slide, applying the tension force to the strap, and coupling the strap at a second end proximate a head end of the evacuation slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1A:
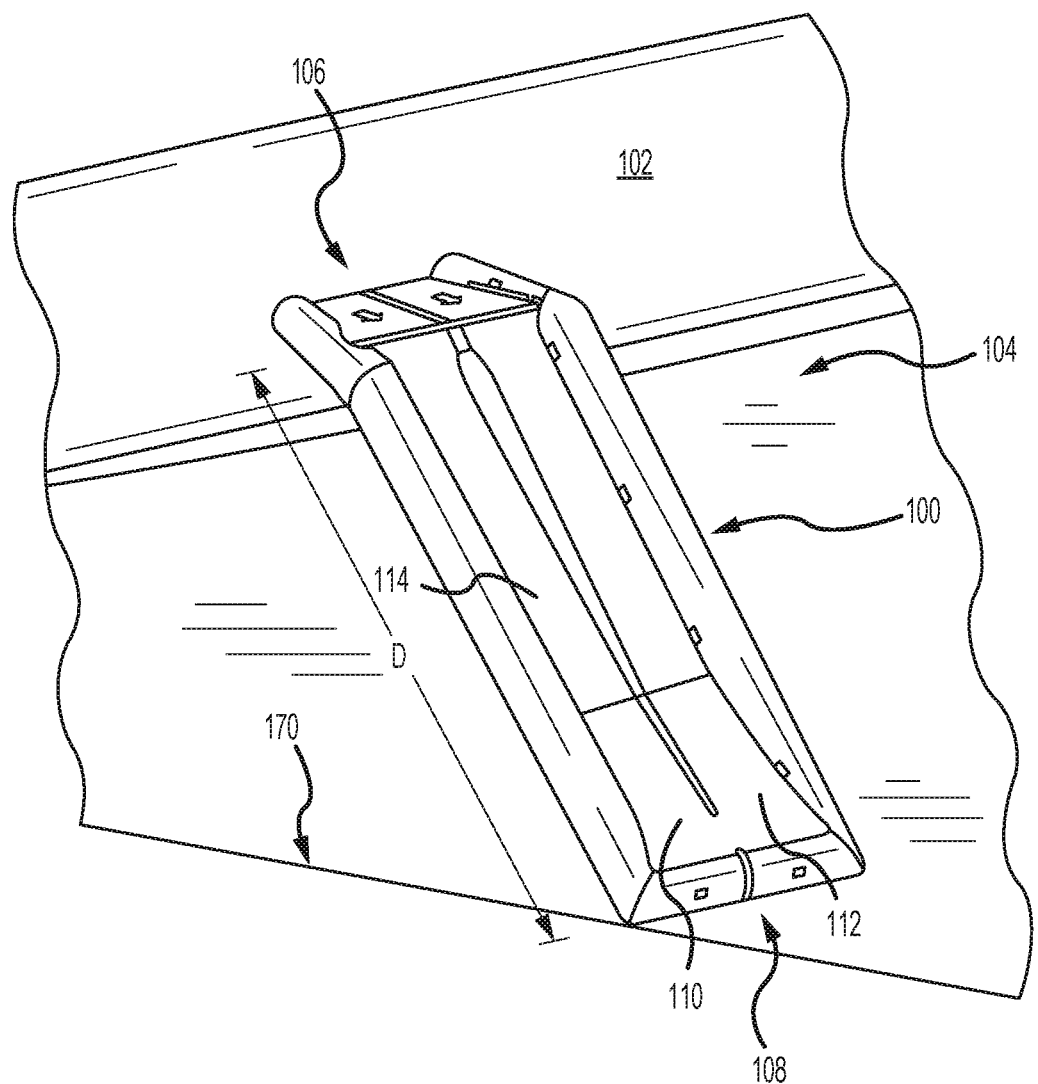
FIG. 1A illustrates a perspective view of an evacuation slide in a deployed position, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface. An arched dropdown tube (also referred to as a protrusion) is provided to distribute the weight or load of an evacuee exiting the aircraft structure via the slide. The slide may comprise a dual lane slide comprising two side tubes (also referred to as inflatable members) and a center tube extending parallel to the lanes. The arched dropdown tube may be coupled between the two side tubes and may contact the center tube when the dual lane slide is inflated. Straps may couple the arched dropdown tube to the center tube. In this regard, the arched dropdown tube arrangement may form a truss structure with the slide for load distribution. In this regard, the arched dropdown tube and strap may increase structural integrity (i.e., beam strength or stiffness of the slide) while tending to minimize weight and pack volume of the slide.

In various embodiments, a truss pillow (also referred to as a protrusion) and strap (or tension member) is provided to distribute the weight or load of an evacuee exiting the aircraft structure via the slide. The slide may comprise a dual lane slide comprising two side tubes and a center tube extending parallel to the lanes. The truss pillow may be coupled along any of the two side tubes or the center tube when the dual lane slide is inflated. Straps may couple the truss pillow to the side tubes or the center tube. In this regard, the truss pillow arrangement with the straps may form a truss structure with the slide for load distribution. In this regard, the truss pillow and strap may increase structural integrity (i.e., beam strength or stiffness of the slide) while tending to minimize weight and pack volume of the slide.

Figure 1B:
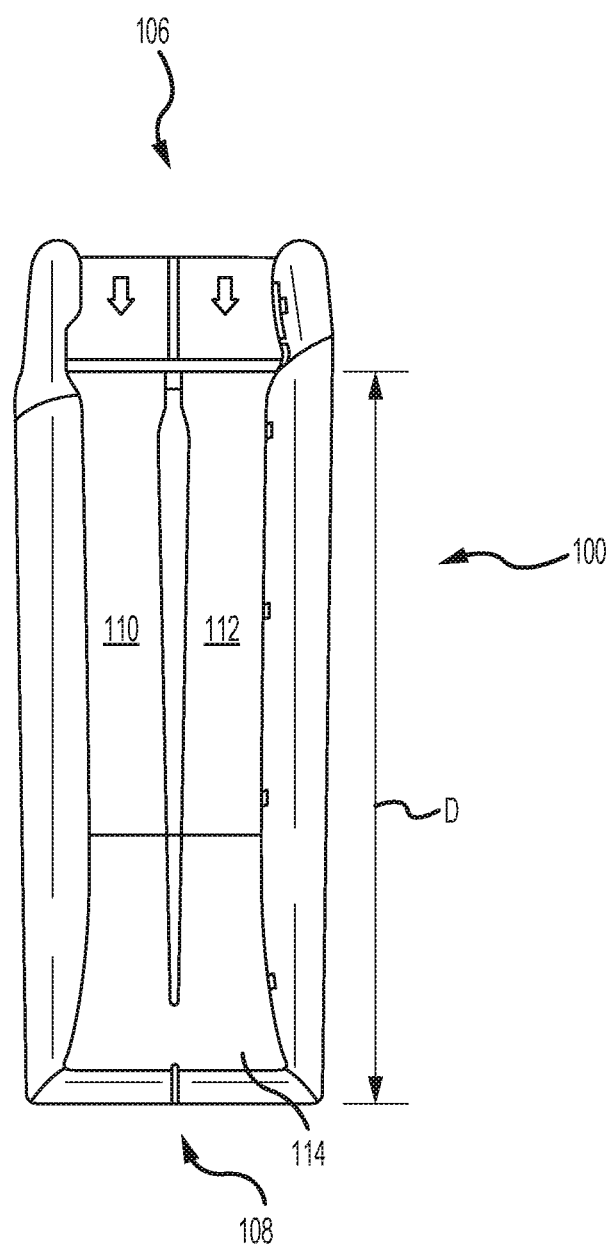
FIG. 1B illustrates a top view of an inflated evacuation slide, in accordance with various embodiments.
Figure 2A:
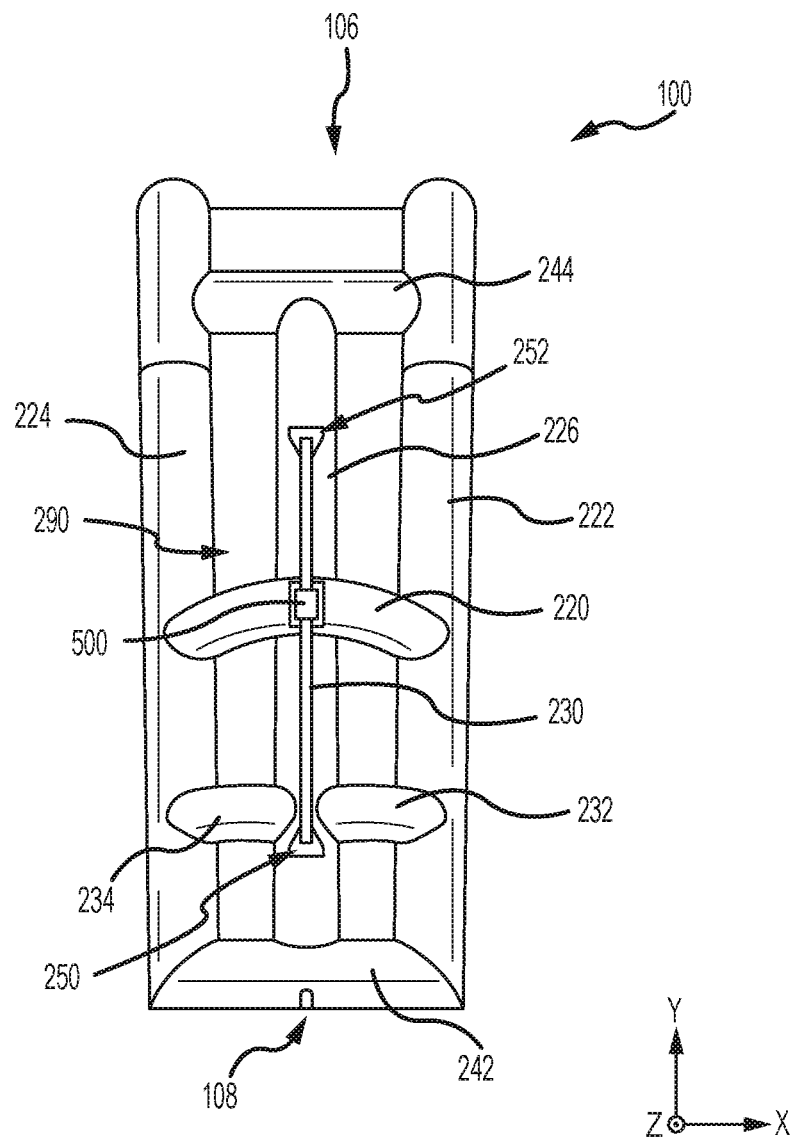
FIG. 2A illustrates a bottom view of an inflated evacuation slide, in accordance with various embodiments.

With respect to FIG. 2A, elements with like element numbering, as depicted in FIG. 1A and FIG. 1B, are intended to be the same and will not necessarily be repeated for the sake of clarity. With respect to FIG. 3A through FIG. 4B elements with like element numbering, as depicted in FIG. 1A through FIG. 2A, are intended to be the same and will not necessarily be repeated for the sake of clarity.

With combined reference to FIG. 1A and FIG. 1B, an evacuation system 104 is illustrated, in accordance with various embodiments. Evacuation system 104 may comprise evacuation slide 100 coupled to an aircraft structure 102. Evacuation slide 100 may comprise a head end 106 and a toe end 108. Head end 106 may be coupled to aircraft structure 102. In various embodiments, aircraft structure 102 may comprise a fuselage, a fairing, a wing, or any other portion of an aircraft. FIG. 1A and FIG. 1B illustrate evacuation slide 100 in a deployed position. Evacuation slide 100 may comprise an inflatable slide. FIG. 1A and FIG. 1B illustrate evacuation slide 100 in an inflated position. Evacuation slide 100 may comprise a dual lane slide comprising a first lane 110 and a second lane 112. Toe end 108 may contact an exit surface 170 in response to evacuation slide 100 being deployed. In various embodiments, evacuation slide 100 may be inflated in response to opening an emergency exit door. Evacuation slide 100 may comprise a sliding surface 114. Sliding surface 114 may comprise a dimension D. Dimension D may comprise the length of sliding surface 114. Dimension D may comprise the length of the sloped portion of evacuation slide 100, in response to evacuation slide 100 being in the deployed or inflated position, as illustrated in FIG. 1A.

With reference to FIG. 2A, a bottom view of evacuation slide 100 is shown having a dropdown tube, i.e. arched tube 220. An xyz-axes is provided for ease of illustration. As used herein, the bottom side 290 of evacuation slide 100 may be the underside of evacuation slide 100, or the side of evacuation slide 100 opposite the sliding surface 114 (see FIG. 1). Arched tube 220 (also referred to herein as a dropdown tube) may be coupled between side tube (also referred to herein as first side tube) 222 and side tube (also referred to herein as second side tube) 224. Arched tube 220 may be located at the bottom side 290 of evacuation slide 100. Center tube 226 may be located between side tube 222 and side tube 224. Side tube 222, side tube 224, and center tube 226 may be disposed in parallel. Stated another way, side tube 222, side tube 224, and center tube 226 may each extend in a similar direction (i.e., in the y-direction) (also referred to herein as a first direction). Side tube 222, side tube 224, and center tube 226 may each extend in the xy-plane (also referred to herein as a first plane). Side tube 222, side tube 224, and center tube 226 may be coupled together at toe end 108 via cross tube 242. Cross tube 242 may be in contact with the exit surface (i.e., exit surface 170 of FIG. 1A) in response to evacuation slide 100 being deployed. Side tube 222, side tube 224, and center tube 226 may be coupled together at head end 106 via cross tube 244.

Figure 2B:
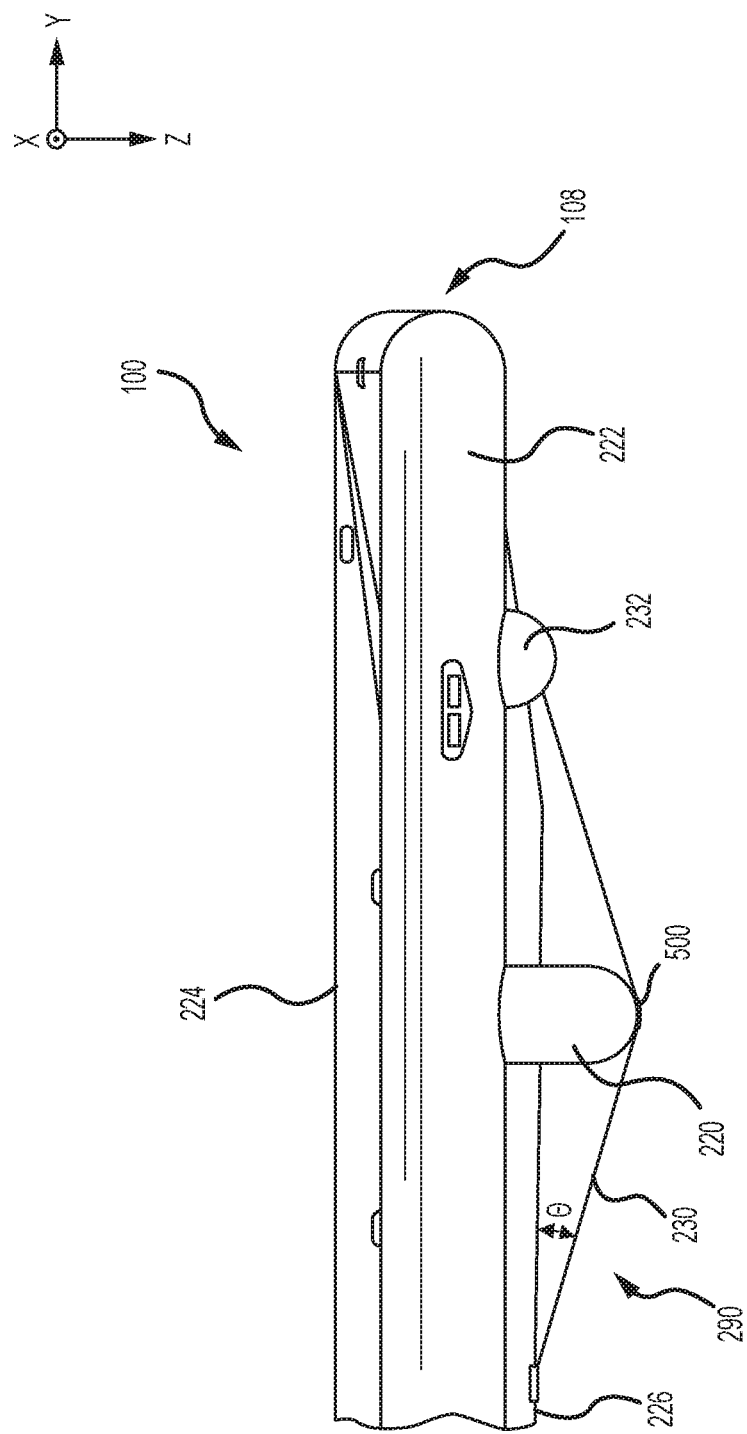
FIG. 2B illustrates a side view of an inflated evacuation slide, in accordance with various embodiments.

With reference to FIG. 2B, a side view of evacuation slide 100 is illustrated, in accordance with various embodiments. An xyz-axes is provided for ease of illustration. Center tube 226 may be disposed below side tubes 222, 224. Stated another way, center tube 226 may extend below side tubes 222, 224. In this regard, arched tube 220 may comprise a single, seamless arch between both ends of arched tube 220. Center tube 226 may be in contact with arched tube 220 in response to evacuation slide 100 being deployed. Contact between center tube 226 and arched tube 220 may allow loads to be transferred between center tube 226 and arched tube 220.

In various embodiments, with combined reference to FIG. 1B and FIG. 2A, arched tube 220 may be located between cross tube 242 and cross tube 244. Arched tube 220 may be located substantially half-way between cross tube 242 and cross tube 244. In various embodiments, arched tube 220 may be located between twenty percent (20%) and eighty percent (80%) of dimension D from toe end 108, and in various embodiments, between thirty percent (30%) and seventy percent (70%) of dimension D from toe end 108, and in various embodiments, between forty percent (40%) and sixty percent (60%) of dimension D from toe end 108, and in various embodiments, between forty-five percent (45%) and fifty-five percent (55%) of dimension D from toe end 108.

In various embodiments, side tube 222 and center tube 226 may at least partially define first lane 110 (see FIG. 1). Side tube 224 and center tube 226 may at least partially define second lane 112 (see FIG. 1). In various embodiments, arched tube 220 may extend substantially orthogonal (i.e., in the x-direction) to side tube 222, side tube 224, and/or center tube 226. In various embodiments, arched tube 220 may extend in the xz-plane (also referred to herein as a second plane) as illustrated in FIG. 2A.

In various embodiments, with reference to FIG. 2A, strap 230 may be coupled to center tube 226 at location 250 and location 252. In various embodiments, strap 230 may be attached to center tube 226 via an adhesive or glue. Strap 230 may be coupled to arched tube 220 by a continuous tension coupling 500. In various embodiments, continuous tension coupling 500 may be attached to arched tube 220 via an adhesive or glue. In various embodiments, arched tube 220 may be configured to provide vertical support to slide 100 in response to a tension in strap 230. When viewing evacuation slide 100 from the bottom, strap 230 extends in a direction (i.e., the y-direction) parallel with center tube 226, as illustrated in FIG. 2A. Although strap 230 may extend in a direction having a component orthogonal to the xy-plane, strap 230 may extend in a direction having a component in the y-direction. Stated another way, with additional reference to FIG. 2B, strap 230 may comprise an angle theta (Θ) relative to center tube 226, when viewed from the side, as illustrated in FIG. 2B. In various embodiments, angle Θ may comprise between five degrees and eighty-five degrees (5°-85°), and in various embodiments, between ten degrees and fifty-five degrees (10°-55°), and in various embodiments, between ten degrees and forty degrees (10°-40°).

Figure 3A:
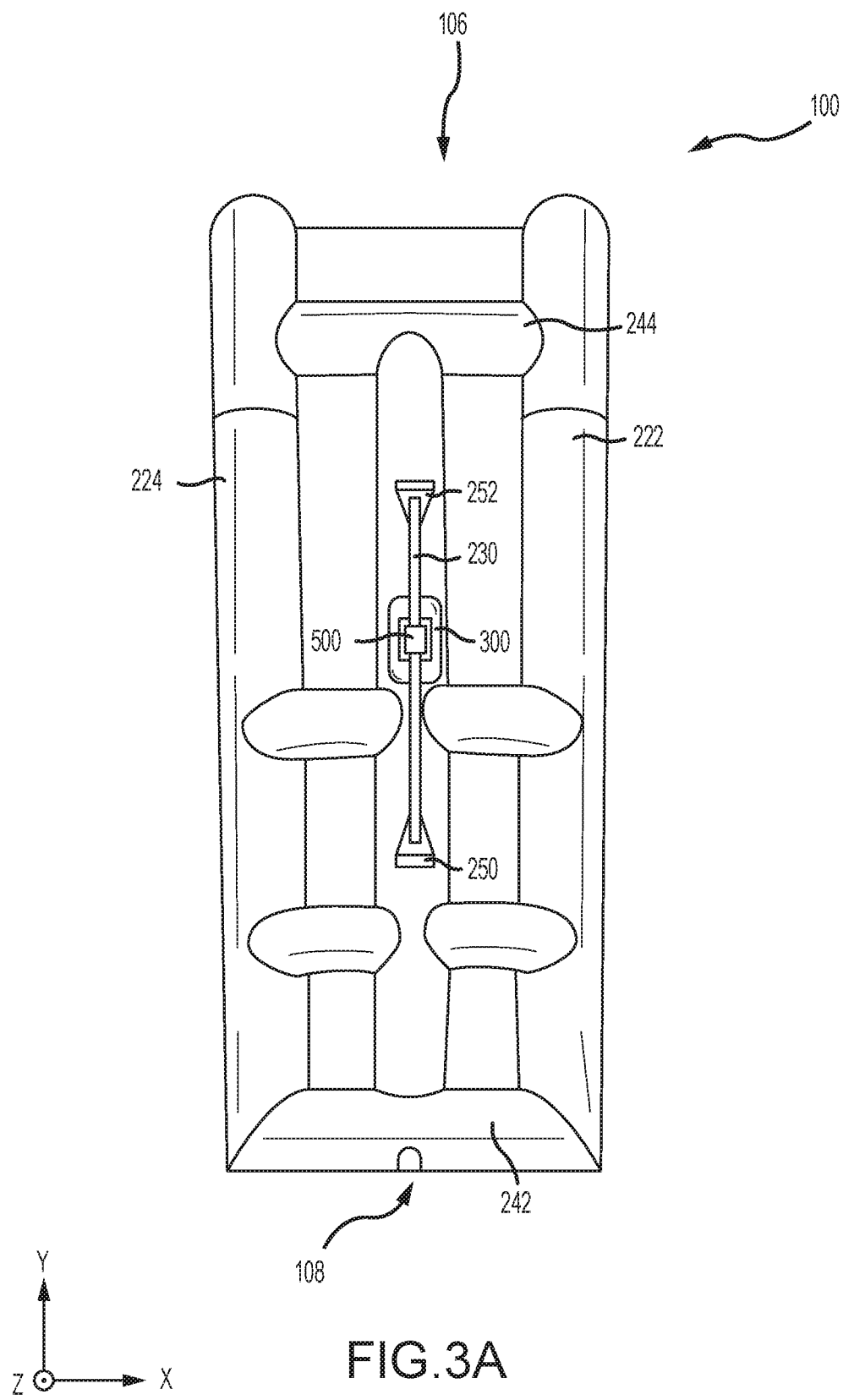
FIG. 3A illustrates a bottom view of an inflated evacuation slide, in accordance with various embodiments.

In various embodiments, with combined reference to FIGS. 1B, 2A, and 3A truss pillow 300 may be coupled to and located along center tube 226 between cross tube 242 and cross tube 244. Truss pillow 300 may be located substantially half-way between cross tube 242 and cross tube 244. In various embodiments, truss pillow 300 may be located between twenty percent (20%) and eighty percent (80%) of dimension D from toe end 108, and in various embodiments, between thirty percent (30%) and seventy percent (70%) of dimension D from toe end 108, and in various embodiments, between forty percent (40%) and sixty percent (60%) of dimension D from toe end 108, and in various embodiments, between forty-five percent (45%) and fifty-five percent (55%) of dimension D from toe end 108.

Figure 3B:
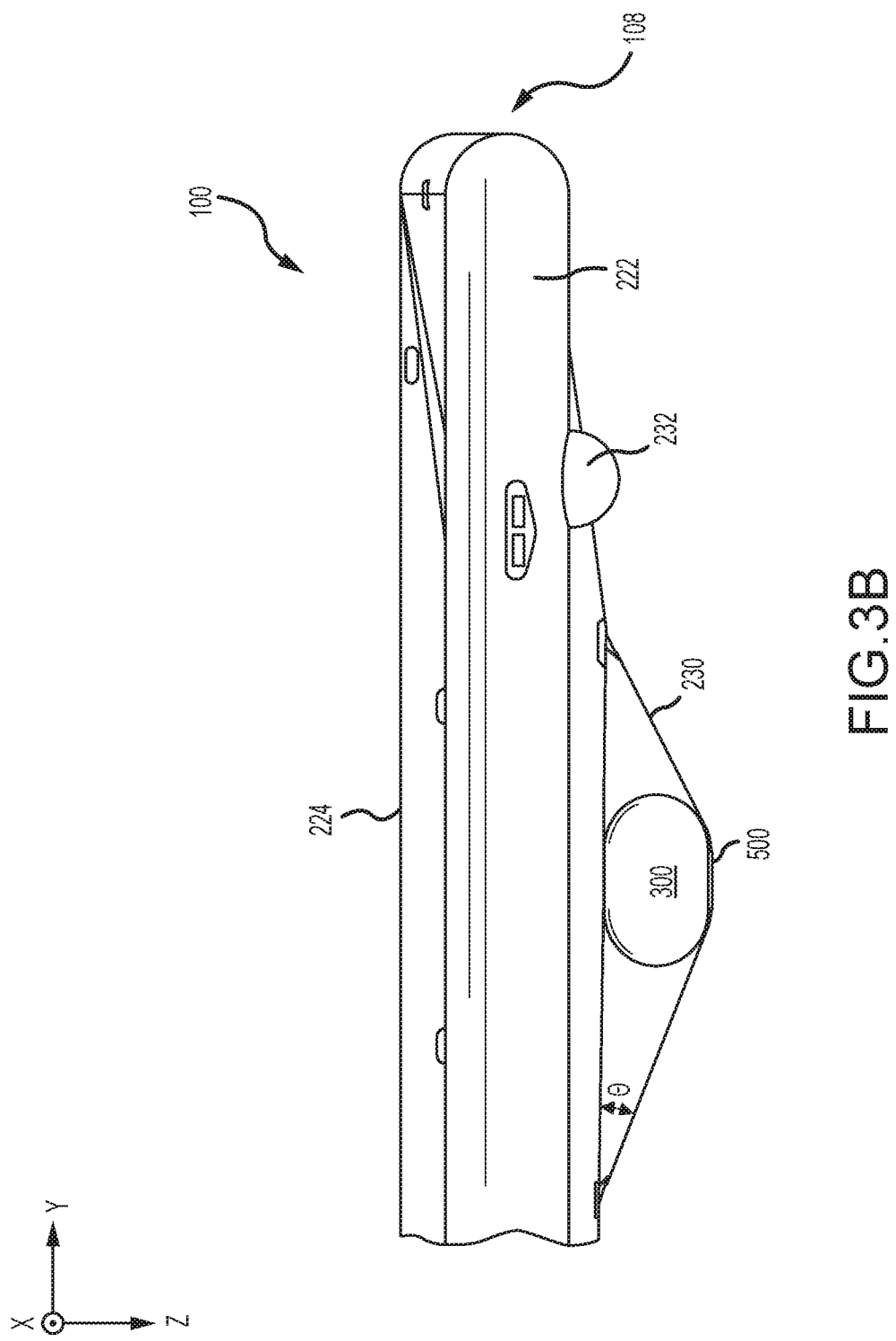
FIG. 3B illustrates a side view of an inflated evacuation slide, in accordance with various embodiments.

In various embodiments, with reference to FIGS. 3A and 3B, truss pillow 300 may be disposed below side tubes 222, 224 and center tube 226. Stated another way, center tube 226 may extend below side tubes 222, 224 and truss pillow 300 may protrude from below center tube 226. Strap 230 may be coupled to center tube 226 at location 250 and location 252. In various embodiments, strap 230 may be attached to center tube 226 via an adhesive or glue. Strap 230 may be coupled to truss pillow 300 by a continuous tension coupling 500. In various embodiments, truss pillow 300 may be configured to provide vertical support to slide 104 in response to a tension in straps 230. In various embodiments, continuous tension coupling 500 may be attached to truss pillow 300 via an adhesive or glue. When viewing evacuation slide 100 from the bottom, strap 230 extends in a direction (i.e., the y-direction) parallel with center tube 226, as illustrated in FIG. 3A. Although strap 230 may extend in a direction having a component orthogonal to the xy-plane, strap 230 may extend in a direction having a component in the y-direction. Stated another way, with additional reference to FIG. 3B, strap 230 may comprise an angle theta (Θ) relative to center tube 226, when viewed from the side, as illustrated in FIG. 2B. In various embodiments, angle Θ may comprise between five degrees and eighty-five degrees (5°-85°), and in various embodiments, between ten degrees and fifty-five degrees (10°-55°), and in various embodiments, between ten degrees and forty degrees (10°-40°).

Figure 4A:
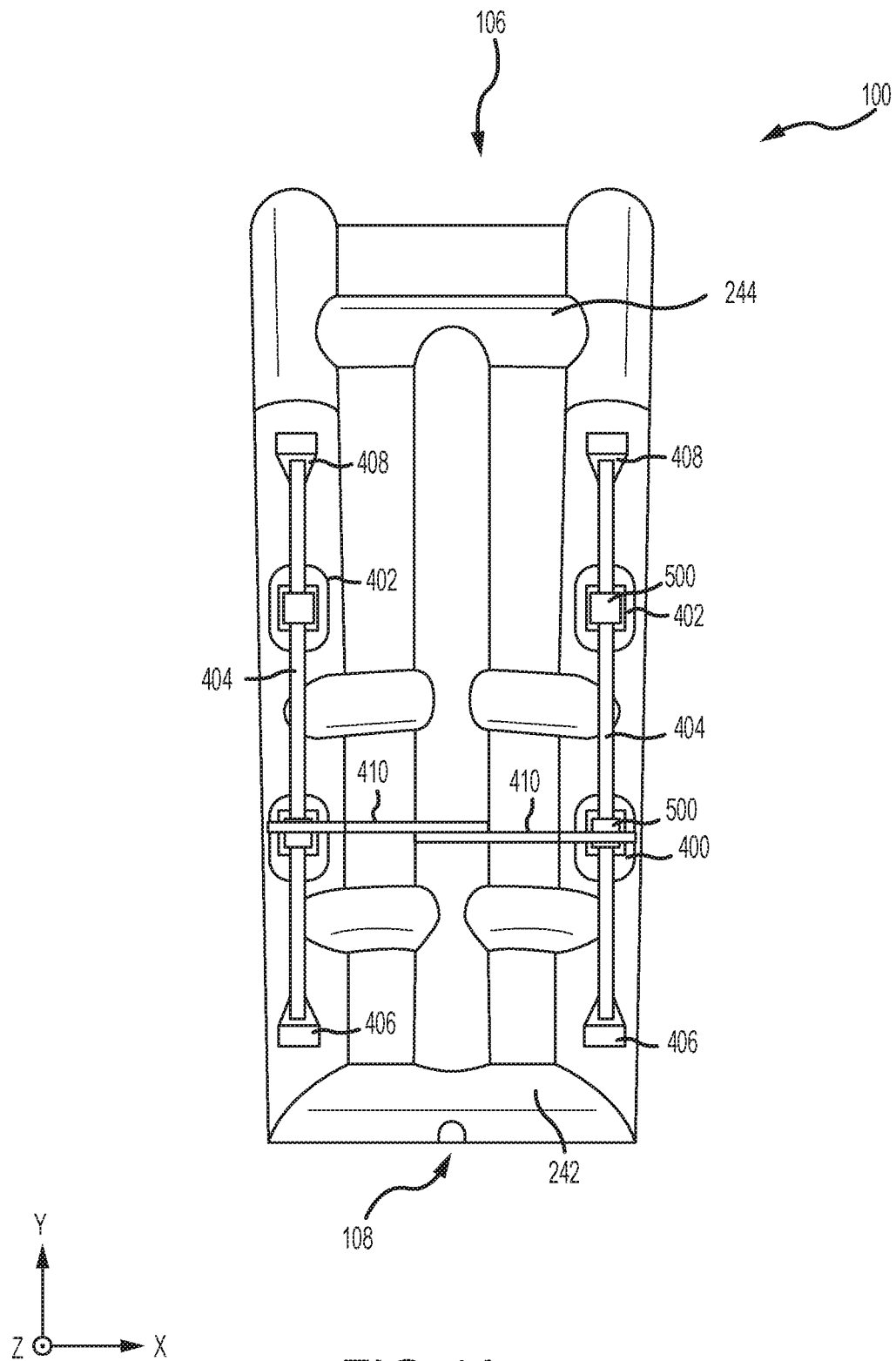
FIG. 4A illustrates a bottom view of an inflated evacuation slide, in accordance with various embodiments.

In various embodiments, with combined reference to FIGS. 1B, 2A, and 4A, truss pillows 400 and truss pillows 402 may be coupled to and located along side tube 222 and side tube 224. In various embodiments, truss pillows 400 may be located between ten percent (10%) and fifty percent (50%) of dimension D from toe end 108, and in various embodiments, between fifteen percent (15%) and forty percent (40%) of dimension D from toe end 108, and in various embodiments, between twenty percent (20%) and thirty percent (30%) of dimension D from toe end 108. In various embodiments, truss pillows 402 may be located sixty percent (60%) and one hundred percent (100%) of dimension D from toe end 108, and in various embodiments, between sixty-five percent (65%) and ninety percent (90%) of dimension D from toe end 108, and in various embodiments, between seventy percent (70%) and eighty percent (80%) of dimension D from toe end 108.

Figure 4B:
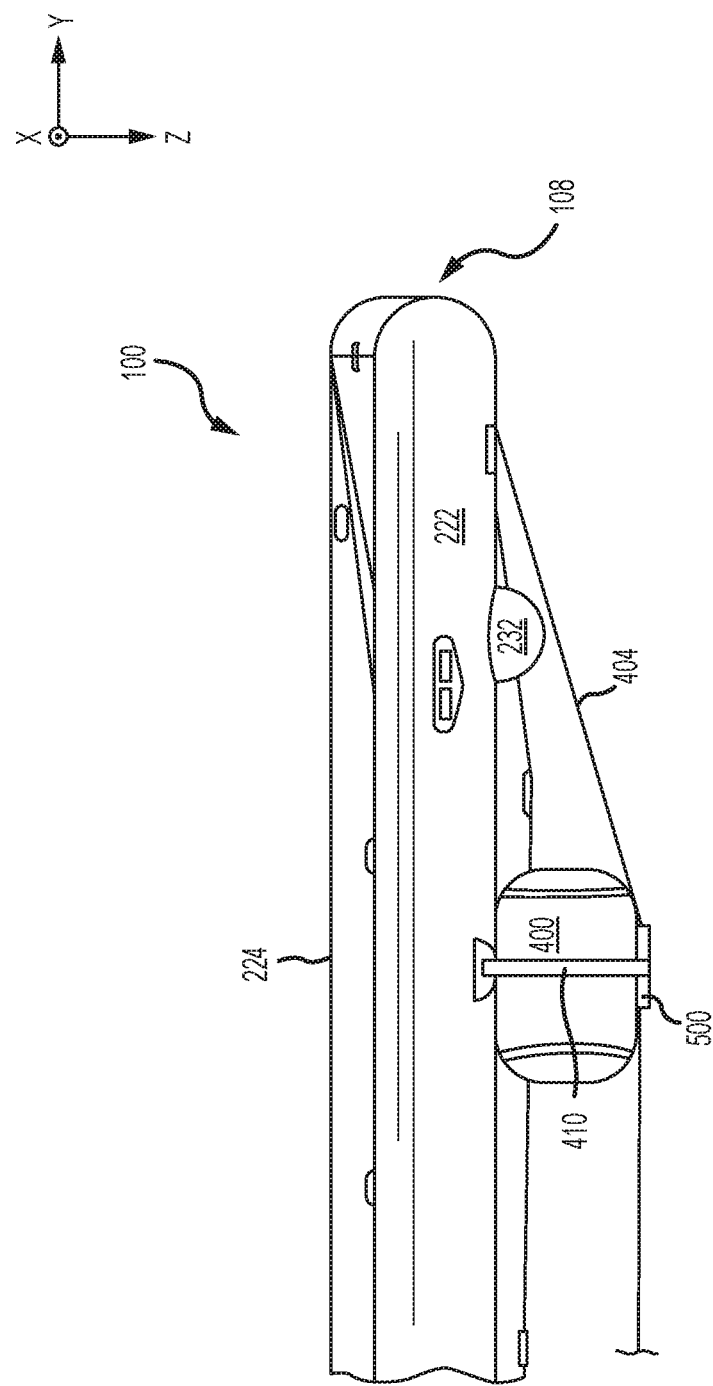
FIG. 4B illustrates a side view of an inflated evacuation slide, in accordance with various embodiments.

In various embodiments, with reference to FIGS. 4A and 4B, truss pillows 400 and truss pillows 402 may be disposed below side tubes 222, 224 and center tube 226. Stated another way, center tube 226 may extend below side tubes 222, 224 and truss pillows 400 and truss pillows 402 may protrude from below side tube 222 and side tube 224. Straps 404 may be coupled to side tube 222 and side tube 224 at location 406 proximate toe end 108 and location 408 proximate head end 106. In various embodiments, straps 404 may be attached to side tube 222 and side tube 224 via an adhesive or glue. Straps 404 may be coupled to truss pillows 400 and truss pillows 402 by a continuous tension coupling 500. In various embodiments, truss pillows 400 and truss pillows 402 may be configured to provide vertical support to slide 104 in response to a tension in straps 404. In various embodiments, cross straps 410 are coupled across truss pillows 400 and/or 402 and tend to prevent the pillows from rotating axially about the side tube (rotation about the y-axis). In various embodiments and with brief reference to FIG. 5, cross straps 410 are coupled over or under (along the z-axis) a continuous tension coupling 500 to base portion 502 or sleeve portion 504. In various embodiments, cross straps 410 may be coupled to center tube 226 and to a side tube, such as side tube 222 or side tube 224.

Figure 5:
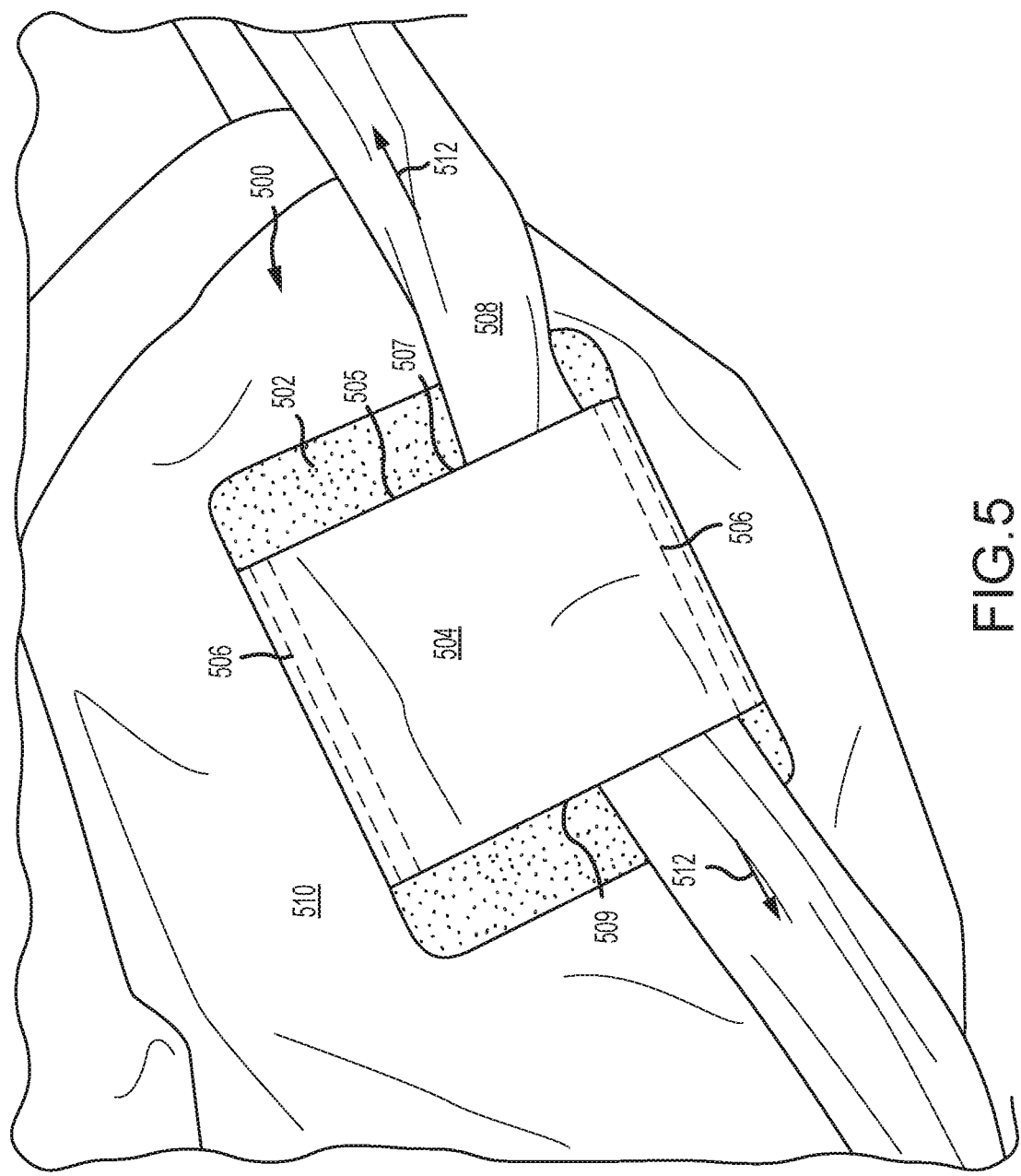
FIG. 5 illustrates a continuous tension coupling, in accordance with various embodiments.

With reference now to FIG. 5, a continuous tension coupling 500 may comprise a base portion 502 and a sleeve portion 504. In various embodiments, sleeve portion 504 may be coupled to base portion 502 by stitching 506, or by any other suitable means known to those proficient in the art, forming a void space 505 between base portion 502 and sleeve portion 504. Sleeve portion 504, having a first edge 507 and a second edge 509, is coupled across a tension strap 508, such as, for example with brief reference to FIGS. 2A, 3A, and 4A, strap 230 or straps 404, and tension strap 508 may pass through the void space 505, open along first edge 507 and second edge 509, between base portion 502 and sleeve portion 504. Tension strap 508 tends to be restrained laterally by stitching 506 but tends to be unrestrained at first edge 507 and second edge 509 and, in response to tension force 512 may slide along the base portion 502 in the void space 505 between the sleeve portion 504. In various embodiments, base portion 502 may be coupled to a surface 510 by a glue or an adhesive such as a two part adhesive. In various embodiments, and with combined reference to FIGS. 2A, 3A, and 4A, surface 510 may be a truss pillow such as, for example, truss pillow 300 or truss pillow 400 or truss pillow 402, or may be a dropdown tube such as, for example, arched tube 220, or any other suitable part of an inflatable evacuation slide.

In various embodiments, base portion 502 may comprise the same material as a sliding surface, such as, for example sliding surface 114. In various embodiments, a strap, such as strap 230, straps 404, cross straps 410, or tension strap 508 may comprise a rope, tape, ribbon, webbing, or any other suitable strap. In various embodiments, a strap may comprise a corded or woven strap. In various embodiments, a strap may comprise an elastomer. In various embodiments, a strap may comprise aramid, para-aramid such as that sold commercially as Kevlar®, nylon, ballistic nylon, polypropylene, polyethylene, or ultra-high-molecular-weight polyethylene such as that sold commercially as Dyneema® and Spectra®, polyester, cotton, or any other suitable material.

Figure 6:
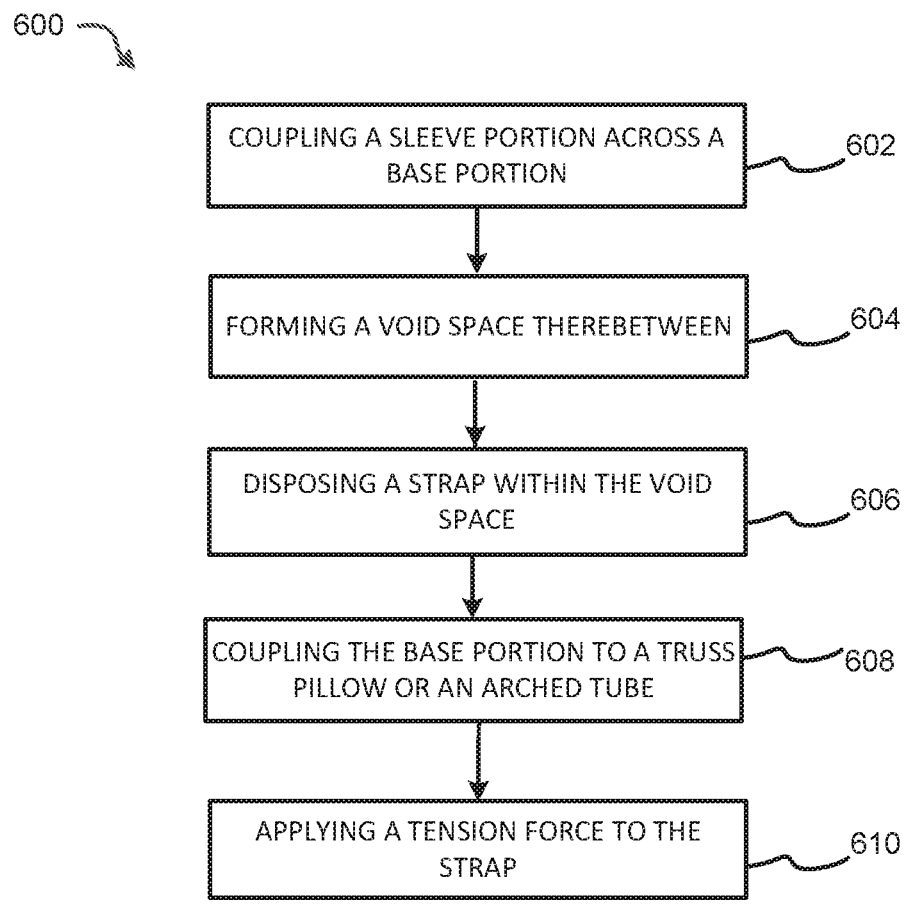
FIG. 6 illustrates a method for manufacturing a continuously tensioned truss strap, in accordance with various embodiments.

With reference to FIG. 6, A method 600 for manufacturing continuously tensioned truss strap is provided, in accordance with various embodiments. Method 600 may comprise providing a base portion, coupling a sleeve portion having a first edge and a second edge across the base portion 602, forming a void space therebetween opening along the first edge and the second edge 604, and disposing a strap within the void space 606 configured to slide along the base portion in response to a tension force. In various embodiments, method 600 may further comprise coupling the base portion to one of a truss pillow or an arched tube 608. In various embodiments, method 600 may further comprise comprising coupling the strap at a first end proximate a toe end of an evacuation slide, applying the tension force to the strap 610, and coupling the strap at a second end proximate a head end of the evacuation slide.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A support arrangement for an inflatable evacuation system, comprising:
   an inflatable member configured to be elongated and stiffened in a longitudinal direction in response to being in an inflated condition;
   a protrusion extending orthogonal to a surface of the inflatable member;
   a tensile member attached at least two locations to the inflatable member on opposing sides of the protrusion and being slidably engagable over the protrusion so as to maintain about equal tension in the tensile member on opposing sides of the protrusion; and
   a sleeve attached to the protrusion configured to maintain the tensile member laterally relative to the protrusion even as the tensile member is able to slide longitudinally.

2. The support arrangement of claim 1, further comprising a first strap disposed within a void space.

3. The support arrangement of claim 2, wherein the first strap is configured to slide along a base portion in response to a tension force.

4. The support arrangement of claim 3, wherein the base portion is coupled to a surface.

5. The support arrangement of claim 4, wherein the first strap further comprises a first end coupled proximate a head end of an evacuation slide and a second end coupled proximate a toe end of the evacuation slide.

6. The support arrangement of claim 5, wherein the base portion comprises a same material as a sliding surface of the evacuation slide.

7. The support arrangement of claim 4, further comprising a second strap coupled to one of the base portion or a sleeve portion.

8. The support arrangement of claim 2, wherein the first strap comprises one of a corded or woven material, an elastomer, an aramid, a para-aramid, a nylon, a ballistic nylon, a polypropylene, a polyethylene, an ultra-high-molecular-weight polyethylene, a polyester, or a cotton.

* * * * *